(12) United States Patent
Cheng et al.

(10) Patent No.: US 7,541,403 B2
(45) Date of Patent: Jun. 2, 2009

(54) THERMAL INTERFACE MATERIAL

(75) Inventors: Ching-Tai Cheng, Tu-Cheng (TW); Nien-Tien Cheng, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 321 days.

(21) Appl. No.: 11/309,611

(22) Filed: Aug. 31, 2006

(65) Prior Publication Data
US 2007/0160855 A1    Jul. 12, 2007

(30) Foreign Application Priority Data
Dec. 16, 2005    (CN) .......................... 2005 1 0120673

(51) Int. Cl.
*C08K 3/22*    (2006.01)

(52) U.S. Cl. ...................... 524/432; 524/430; 524/441; 524/588; 252/75; 252/78.3

(58) Field of Classification Search ................ 524/430, 524/432, 441, 588
See application file for complete search history.

(56) References Cited

U.S. PATENT DOCUMENTS 5,356,549 A    10/1994    Takahashi et al.
6,114,429 A *   9/2000    Yamada et al. ............... 524/432

* cited by examiner

*Primary Examiner*—Margaret G Moore
(74) *Attorney, Agent, or Firm*—Frank R. Niranjan

(57) ABSTRACT

A thermal interface material includes 100 parts by weight of base oil including amino-modified silicone fluid and at least one of methylphenylsilicone fluid and fluorosilicone fluid, and 800 to 1200 parts by weight of fillers filled in the base oil. The fillers have an average particle size of 0.1 to 5 um and are selected from the group consisting of zinc oxide powder, alumina powder and metallic aluminum powder.

16 Claims, No Drawings

THERMAL INTERFACE MATERIAL

DESCRIPTION

FIELD OF THE INVENTION

The present invention relates to a thermal interface material which is interposable between a heat-generating electronic component and a heat sink.

DESCRIPTION OF RELATED ART

In nowadays, thermal interface materials are applied to semiconductor devices to fill in air interstices formed between heat sinks and the semiconductor devices in order to improve heat dissipation efficiencies of the semiconductor devices.

The thermal interface material includes a base oil and fillers filled in the base oil. The base oil fills the air interstices to perform an intimate contact between the heat sinks and the semiconductor devices, whilst the fillers are used for improving the thermal conductivity of the thermal interface material, thereby increasing the heat dissipation efficiencies for the semiconductor devices. Dimethyl silicone oil is often used as the base oil for the thermal interface material. The dimethyl silicone oil is used in a temperature range from −50° C. to 170° C. When the temperature exceeds 170° C., the dimethyl silicone oil may breed out of the thermal interface material, which not only lowers the heat transfer effect of the thermal interface material but also may contaminate the semiconductor device. However, as the operating temperature of the up-to-date semiconductor devices increases significantly, which always exceeds 170° C., the conventional thermal interface material with the dimethyl silicone oil as base oil can no longer meet the requirement of heat dissipation for the up-to-date semiconductor devices.

SUMMARY OF THE INVENTION

The present invention relates to a thermal interface material for heat dissipation for heat generating electronic components. According to a preferred embodiment of the present invention, the thermal interface material includes 100 parts by weight of base oil including amino-modified silicone fluid and at least one of methylphenylsilicone fluid and fluorosilicone fluid, and 800 to 1200 parts by weight of fillers filled in the base oil, having an average particle size of 0.1 to 5 um and selected from the group consisting of zinc oxide powder, alumina powder and metallic aluminum powder.

Other advantages and novel features of the present invention will become more apparent from the following detailed description of preferred embodiment:

DETAILED DESCRIPTION OF THE INVENTION

A thermal interface material in accordance with a preferred embodiment of the present invention is silicone grease composition having high thermal conductivity, and includes a base oil and an amount of fillers filled in the base oil.

The base oil is 100 parts by weight of the thermal interface material. The base oil is silicon oil which has viscosity in a range from 50 to 5,000 cs at 25° C., and includes methylphenylsilicone fluid, fluorosilicone fluid and amino-modified silicone fluid. The methylphenylsilicone fluid and fluorosilicone fluid are used in a temperature range from −30° C. to 250° C. and are well resistant against high temperature. The amino-modified silicone fluid is used in a temperature range from −50° C. to 200° C. and is well resistant against low temperature. The methylphenylsilicone fluid, fluorosilicone fluid and amino-modified silicone fluid are mixed together at a ratio of 1:1:2, so that the thermal interface material containing the mixed base oil can be used in a temperature range from −50° C. to 250° C. Alternatively, the base oil may be a mixture of the methylphenylsilicone fluid and the amino-modified silicone fluid blended in a ratio of 1:1, or a mixture of the fluorosilicone fluid and the amino-modified silicone fluid blended in a ratio of 1:1.

The amino-modified silicone fluid has a formula $R_a^1 R_b^2 SiO_{(4-a-b)/2}$ having an amine equivalent of 10,000 to 20,000 g/mol. In the formula, $R^1$ is a group of the formula: $-R^3-NH_2$, or $-R^3-NHR^4-NH_2$, wherein $R^3$ and $R^4$ which may be identical or different and are alkylene groups having 1 to 8 carbon atoms, preferably 2 or 3 carbon atoms. $R^2$ is a substituted or unsubstituted monovalent hydrocarbon group having 1 to 6 carbon atoms which is attached to the silicon atom in the molecule. Examples of the hydrocarbon group include alkyl groups such as methyl, ethyl, propyl, butyl and hexyl groups, cycloalkyl groups such as cyclopentyl and cyclohexyl groups, a phenyl group, and halogenated alkyl groups such as trifluoropropyl and nonafluorohexyl groups, wherein the methyl group is preferred. The a and b are positive numbers in the range: $0.0001 \leq a \leq 0.01$ and $1.95 \leq a+b \leq 2.20$. Outside this range, the silicone grease is less resistant against heat.

The fillers are 800 to 1200 parts by weight of the thermal interface material. The fillers are a mixture of metallic aluminum, alumina, and zinc oxide powders in a weight ratio from 3:1:1 to 6:1:1, and have an average particle size from 0.1 to 5 um. Alternatively, the fillers may be one or two kinds of powders selected from the group consisting of metallic aluminum powder, alumina powder, and zinc oxide powder. When the fillers are a mixture of two kinds of powders, the weight ratio of the metallic aluminum powder to the alumina powder, the alumina powder to the zinc oxide powder, or the metallic aluminum powder to the zinc oxide powder is from 1:1 to 10:1.

In the present thermal interface material, the base oil is a mixture selected from the group consisting of methylphenylsilicone fluid and fluorosilicone fluid used in a temperature range from −30° C. to 250° C. and amino-modified silicone fluid used in a temperature range from −50° C. to 200° C. This means the thermal interface material can be used in a temperature range from −50° C. to 250° C., and has excellent heat resistances both in the low and high temperatures. The base oil in accordance with the present invention will not breed out of the thermal interface material even when the temperature of the electronic component with which the thermal interface material is thermally connected reaches 250° C. Thus, the thermal interface material formed in accordance with the preferred embodiment can be used in the up-to-date electronic components which can have a temperature exceeding 170° C. during operation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of portions within the principles of the invention to the full extent indicated by the broad general meaning of the terms in which the appended claims are expressed.

What is claimed is:

1. A thermal interface material comprising:
   100 parts by weight of base oil comprising amino-modified silicone fluid and at least one of methylphenysilicone fluid and fluorosilicone fluid; and
   800 to 1200 parts by weight of fillers filled in the base oil, having an average particle size of 0.1 to 5 um and being comprised of at least two ingredients selected from the group consisting of zinc oxide powder, alumina powder and metallic aluminum powder, a weight ratio of the at least two ingredients being in a range from 1:1 to 10:1 when the at least two ingredients are the metallic aluminum powder and the alumina powder, a weight ratio of the at least two ingredients being in a range from 1:1 to 10:1 when the at least two ingredients are the alumina powder and the zinc oxide powder and a weight ratio of the at least two ingredients being in a range from 1:1 to 10:1 when the at least two ingredients are the metallic aluminum powder and the zinc oxide powder.

2. The thermal interface material as described in claim 1, wherein the base oil has a viscosity from 50 to 50,000 cs at 25° C.

3. The thermal interface material as described in claim 1, wherein the base oil is comprised of the amino-modified silicone fluid, the methylphenysilicone fluid and the fluorosilicone fluid, and a weight ratio of the amino-modified silicone fluid to the methylphenysilicone fluid and to the fluorosilicone fluid is 2:1:1.

4. The thermal interface material as described in claim 1, wherein a weight ratio of the amino-modified silicone fluid to one of the methylphenylsilicone fluid and fluorosilicone fluid is 1:1.

5. The thermal interface material as described in claim 1, wherein the fillers are comprised of the zinc oxide powder, the alumina powder and the metallic aluminum powder and a weight ratio of the metallic aluminum powder to the alumina powder and to the zinc oxide powder is in a range from 3:1:1 to 6:1:1.

6. The thermal interface material as described in claim 1, wherein a temperature of each of the methylphenysilicone fluid and the fluorosilicone fluid in the base oil is in a range from −30° C. to 250° C.

7. The thermal interface material as described in claim 6, wherein a temperature of the amino-modified silicone fluid in the base oil is in a range from −50° C. to 200° C.

8. A thermal interface material comprising:
   a base oil being a mixture of amino-modified silicone fluid, methylphenysilicone fluid and fluorosilicone fluid in a ratio by weight of 2:1:1; and
   fillers filled in the base oil, the fillers being selected from the group consisting of zinc oxide powder, alumina powder and metallic aluminum powder.

9. The thermal interface material as described in claim 8, wherein the fillers have a weight more than that of the base oil.

10. The thermal interface material as described in claim 9, wherein a weight ratio of the fillers to the base oil is about 8:1 to 12:1.

11. The thermal interface material as described in claim 8, wherein the fillers have an average particle size of 0.1 to 5 um.

12. The thermal interface material of claim 8, wherein the fillers are a mixture of the metallic aluminum powder, the alumina powder and the zinc oxide powder in a ratio by weight of 3:1:1 to 6:1:1.

13. A thermal interface material comprising:
   a base oil comprising amino-modified silicone fluid and at least one of methylphenysilicone fluid and fluorosilicone fluid; and
   fillers filled in the base oil, the fillers being a mixture of "metallic aluminum powder, alumina powder and zinc oxide powder" in a ratio by weight of 3:1:1 to 6:1:1.

14. The thermal interface material of claim 13, wherein a weight ratio of the fillers to the base oil is about 8:1 to 12:1.

15. The thermal interface material of claim 14, wherein the base oil is a mixture of the amino-modified silicone fluid, the methylphenysilicone fluid and the fluorosilicone fluid in a ratio by weight of 2:1:1.

16. The thermal interface material of claim 14, wherein a weight ratio of the amino-modified silicone fluid to one of the methylphenysilicone fluid and fluorosilicone fluid is 1:1.

* * * * *